（12） United States Patent
Kishnani (10) Patent No.: US 9,311,059 B2
(45) Date of Patent: Apr. 12, 2016

(54) SOFTWARE DEVELOPMENT TOOL THAT PROVIDES CONTEXT-BASED DATA SCHEMA CODE HINTING

(75) Inventor: Amit C. Kishnani, Foster City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2796 days.

(21) Appl. No.: 11/733,596

(22) Filed: Apr. 10, 2007

(65) Prior Publication Data

US 2014/0304679 A1    Oct. 9, 2014

(51) Int. Cl.
*G06F 9/44* (2006.01)

(52) U.S. Cl.
CPC .................................. *G06F 8/33* (2013.01)

(58) Field of Classification Search
None
See application file for complete search history.

(56) References Cited

U.S. PATENT DOCUMENTS

| | | | | |
|---|---|---|---|---|
| 7,191,405 B1 * | 3/2007 | Jaramillo | ................... | G06F 8/33 |
| | | | | 715/201 |
| 7,890,919 B1 * | 2/2011 | Williams | ....................... | 717/100 |
| 2002/0016953 A1 * | 2/2002 | Sollich | ...................... | G06F 8/33 |
| | | | | 717/100 |
| 2010/0975036 | 10/2004 | Williams | | |
| 2005/0278695 A1 * | 12/2005 | Synovic | .................... | G06F 8/33 |
| | | | | 717/112 |
| 2011/0733620 | 4/2007 | Kishnani | | |

* cited by examiner

*Primary Examiner* — Lewis A Bullock, Jr.
*Assistant Examiner* — Christine Dang
(74) *Attorney, Agent, or Firm* — Kilpatrick Townsend & Stockton LLP (57) ABSTRACT

A software application development tool provides context-based data schema code hinting. Code "regions" are defined in the code for an application that is under development. One or more data sources that are referenced by a code region may be defined. The development tool detects when a designer is attempting to reference a data schema, such as by detecting that the designer has input a specified trigger, within a region of the code, and in response, the development tool provides code hints for the data schema for corresponding data source(s) that is/are referenced in the corresponding code region in which the designer is working. Thus, rather than providing data schema code hinting for all data sources referenced by the application, targeted code hinting is employed by presenting data schema code hints for only the data source(s) that are referenced by a defined code region in which the designer is working.

22 Claims, 5 Drawing Sheets

SOFTWARE DEVELOPMENT TOOL THAT PROVIDES CONTEXT-BASED DATA SCHEMA CODE HINTING

TECHNICAL FIELD

The following description relates generally to software development tools, and more specifically to a software development tool for markup language coding that provides context-based data schema code hinting based, for example, on a defined region of the code in which a developer is working.

BACKGROUND

Many software development tools are available today for use by software designers (or "developers") in creating various types of software applications. Software "designers" and "developers" are used interchangeably herein, and generally refer to anyone involved with using a software development tool for authoring, designing, or otherwise creating or modifying a software application. In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing markup language (e.g., HTML, XML, etc.) applications are among the most commonly used.

Thus, IDEs provide software tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is an IDE that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™), and the like.

An IDE may allow a developer to create a document in an environment that includes both a text-based code view and a graphical-based design view. The code view renders the source code (e.g., markup language code) as text in a portion of the screen and allows the developer to see and manipulate the source code in the document file. For example, the developer may write and edit HTML or Cascading Style Sheets (CSS) code in the code view. The design view, on the other hand, is a What You See Is What You Get (WYSIWYG) view of the document that allows the user to visually manipulate the interpreted and graphically laid-out version of the document, such as, for example, by dragging, dropping, cutting, and pasting visual components. As the developer works, changes to the document are reflected in both the code view and the design view.

One popular web development technique that may be employed by a developer when working with a development tool for developing a web page is known as AJAX. AJAX, shorthand for Asynchronous JavaScript and XML, which is a well-known web development technique for creating interactive web applications that process user requests immediately. AJAX combines several programming tools including JavaScript, dynamic HTML (DHTML), Extensible Markup Language (XML), cascading style sheets (CSS), the Document Object Model (DOM), and the Microsoft object, XMLHttpRequest. In general, AJAX permits web pages to be created such that regions of the page may be updated without requiring a full page refresh. AJAX allows content on web pages to update immediately when a user performs an action, unlike an HTTP request, during which users must wait for a whole new page to load. For example, a weather forecasting site could display local conditions on one side of the page without delay after a user types in a zip code.

Web pages, unlike native applications, are loosely coupled, meaning that the data they display are not tightly bound to data sources and must be first marshalled (set out in proper order) into an HTML page format before they can be presented on a client machine. For this reason, web pages traditionally had to be re-loaded each time a user was to view different datasets (e.g., as the data being presented on the web page changed). By using the XmlHttpRequest object to request and return data without a re-load, a programmer bypasses this requirement and makes the loosely coupled web page behave much like a tightly coupled application, but with a more variable lag time for the data to pass through a longer "wire" to the remote web browser.

Thus, using AJAX, a developer can bind data on the client-browser and update certain regions of a web page without incurring a full page refresh. Each region of the web page that can individually be updated without refreshing the full page may be specified in the web page's underlying markup language code using tags, such as the <div> tag. The intent is to make web pages feel more responsive by exchanging small amounts of data with the server behind the scenes, so that the entire web page does not have to be reloaded each time the user requests a change. This is meant to increase the web page's interactivity, speed, and usability.

Software development tools, such as IDEs, commonly provide various features to help a developer in developing a software application, such as a web page. For instance, software development tools often provide code hinting. Code hinting is a help feature that is used by many software development tools in a code-view editing mode. In general, the development tool monitors the developer's input and attempts to recognize/anticipate code that the developer desires to input, and provides hints as to the code that the development tool believes the developer desires such that the developer can quickly select the hinted code if it is what the developer desires, thereby alleviating the developer from having to fully type the hinted code. As one example, as the developer types code, the development tool may present a pop-up box near the insertion point that lists possible code elements, such as code commands, components, data schemas, application programming interface (API) methods, etc. associated with the input typed by the developer. The developer may then scroll through the list and pick the specific element (e.g., component, tag, data schema, command, method, or the like) from the displayed list instead of typing the desired information to completion. Again, as the developer makes the particular selection, the application development environment inserts the selected code and/or visual rendering thereof in the corresponding section of the code being edited.

While code hinting can be helpful to a developer, and its use generally encourages accuracy in coding (e.g., by reducing typos and other human errors), the inventor of the present application has recognized that often such code hinting presents too many choices to a developer, thus reducing the code hinting feature's usability. For instance, a code hinting pop-up box may present a long list of choices to a developer, thus requiring the developer to scroll through the long list to find the desired code element to insert. If the list is too long, the developer may be discouraged from searching through it and may elect instead to manually type the desired code, and thus the potential benefits of providing code hinting may go unrecognized. The undesirably long lists in code hinting often arise because development tools have traditionally failed to consider the context in which the developer is working when presenting a code hint. For instance, upon recognizing that a developer is attempting to code a reference to a data schema, traditional development tools may present data schema hints for all data sources referenced in the application tinder development, rather than considering the context in which the developer is currently working, such as a given region of the code in which the developer is typing. Accordingly, a desire exists for a software development tool, such as an IDE, that improves the usability of code hinting.

BRIEF SUMMARY

The present invention is directed to systems and methods in which a software application development tool (e.g., DREAMWEAVER, etc.) provides context-based data schema code hinting. In certain embodiments, code "regions" are defined in the code (e.g., mark-up language code) for a software application that is under development. A software application designer's "context" may thus be determined based at least in part on which code region the designer is working. Such code regions may be defined via tags within the code, such as a <div> tag, for example. Further, one or more data sources that are referenced by a defined code region may be defined. For example, in certain embodiments, the <div> tag is used for defining a code region, and such <div> tag may include an attribute that specifies one or more data sources referenced by the region. As an example, a designer may define a code section as follows: <div id="products" spry:region="dsFoo">, wherein this <div> tag defines a code section named "products" which is specified as referencing (or being attached/bound to) a data source "dsFoo".

According to embodiments of the present invention, the software development tool is operable to provide code hints as to data schemas that are applicable to a given region within which the designer is working. In certain embodiments, the software development tool is operable to detect when a designer is attempting to reference a data schema, such as by detecting that the designer has input a specified trigger, such as the "{" character (which is a character that indicates that the information that follows is a reference to a data schema), within a region of the code. In response to such detection, the development tool can automatically provide code hints for the data schema for corresponding data source(s) that is/are referenced in the corresponding code region in which the designer is working. For instance, the development tool may present a pop-up window that contains a list of data schema code hints for the corresponding data source(s) that is/are referenced in the corresponding code region in which the trigger is detected, and the designer may select a desired data schema code to be inserted at the location of the detected trigger in the code.

For example within the above-mentioned "products" code region, the software development tool may provide code hinting for the data schemas for only the referenced data source dsFoo. Thus, rather than providing code hinting as to data schemas for all data sources that may be referenced by the application under development, targeted code hinting may be employed by presenting code hints for the data schemas for only the data source(s) that are referenced by a defined code region in which the designer is working. In this manner, the code hinting may be more user-friendly, which may encourage the use of such code hinting by the designer, thus leading to more efficient and error-free coding.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
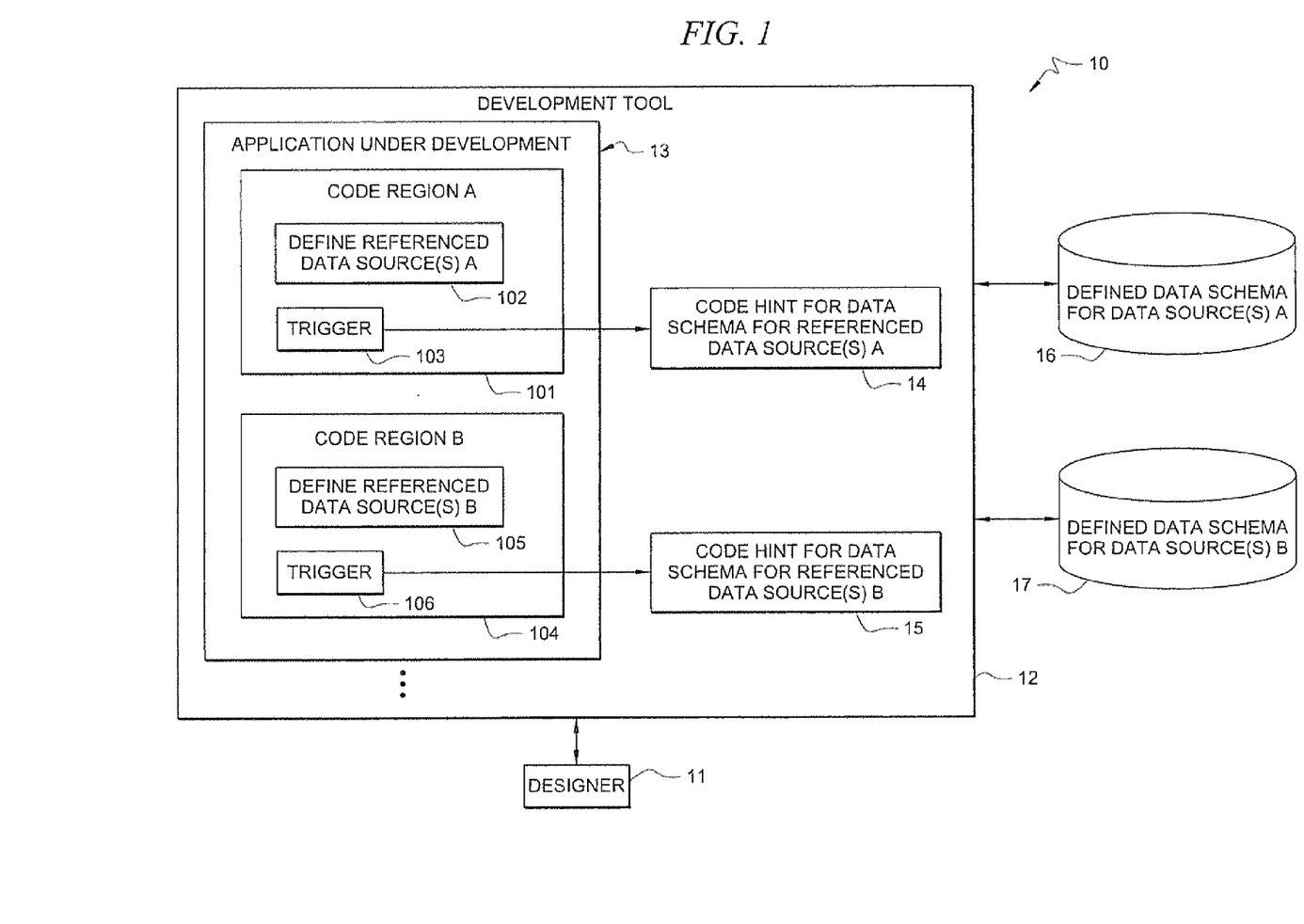
FIG. 1 shows an exemplary system according to one embodiment of the present invention.

FIG. 1 shows an exemplary system 10 according to one embodiment of the present invention. In FIG. 1, a software designer 11 interacts with a development tool 12 to develop (e.g., create, modify, etc.) a software application 13. Software application 13 may be a webpage or other software application. In certain embodiments of the present invention, such software application 13 is coded in a markup language, such as HTML, XML, XHTML, ASP, CFML™, and the like. Software development tool 12 may be an IDE, such as DREAMWEAVER, or other suitable software development tool, as examples. Software development tool 12 may comprise computer-executable software code stored to a computer-readable medium that, when executed by a computer, causes the computer to perform various operations for aiding designer 11 in developing application 13, including the operations described further herein. According to this exemplary embodiment, development tool 12 provides data schema code hinting, such as data schema code hints 14 and 15, based at least in part on the context in which the designer 11 is working, such as within which region of the code the designer 11 is working, as discussed further below.

In this example, the software application 13 that is under development may have its code divided into a plurality of defined "regions", such as code region 101 and code region 104 shown in FIG. 1. The regions may be defined in any suitable way. For instance, as discussed further below, in certain embodiments tags or other designators may be used in the code for defining the regions. For example, the <div> tag is commonly used in AJAX for defining regions of the code. Such <div> tag (and/or other block-level element tags, such as <span>, <p>: etc.) may be used for defining regions within the code, according to one embodiment. For each region, one or more data sources are defined as being referenced by such region. For instance, a definition 102 of the data source(s) referenced by code region 101 is included, and a definition 105 of the data source(s) referenced by code region 104 is included. In certain embodiments, as discussed further below, such definitions 102 and 105 are made as an attribute of their respective region. For instance, region 101 may be defined as <div id="products" spry:region="data_source_A">, wherein the <div> tag specifies that a new region 101 is being defined within the code, the "id" attribute of the tag specifies that the region 101 is identified by the name "products", and the "spry:region" attribute of the tag specifies that the "data_source_A" is defined as being referenced by region 101. Thus, in certain embodiments, the definition 102 specifies which data sources are bound to region 101, and definition 105 specifies which data sources are bound to region 104.

Development tool 12 is operable to monitor the designer 11's input to the code of application 13 and recognize input that indicates that the designer 11 is attempting to input code referencing a data schema, and in response to such recognition the development tool 12 presents code hinting to aid the designer 11 as to the code for referencing a data schema. For example, in response to recognizing designer 11 inputting a trigger 103 within region 101, wherein trigger 103 may be any input to the code that indicates the designer 13 is desiring to input code referencing a data schema, the development tool 12 presents code hinting 14. Similarly, in response to recognizing designer 11 inputting a trigger 106 within region 104, wherein trigger 106 may be any input to the code that indicates the designer 13 is desiring to input code referencing a data schema, the development tool 12 presents code hinting 15. Triggers 103 and 106 may be, for example, a "{" character or other character that when input to the code by the designer 11 indicates that the designer is attempting to code a reference to a data schema.

As is well-known in the art, a "data schema" that is defined for a data source generally describes the data types, etc. that are defined for the corresponding data source. For instance, a data source "dsFoo" may possess certain data types/elements, such as certain fields of a database. This is similar to the concept of various fields being defined for records of a database, such as "employee name", "employee address", "employee telephone number", etc. defined for each record in an employee database. Thus, the schema for "dsFoo" may include such data elements as "descheader", "desc", "features", "ds_RowID". "ds_CurrentRowID", etc., and each of these data elements may be referenced in the mark-up language code for accessing a corresponding part of the data residing in data source "dsFoo". In the example shown in FIG. 1, data schemas 16 are defined for data source(s) A and data schemas 17 are defined for data source(s) B, wherein software development tool 12 is capable of accessing such data schema definitions 16 and 17.

According to embodiments of the present invention, the development tool 12 provides context-based data schema code hinting, thus making the code hinting easier to use by, for instance, alleviating undesired data schema code references from the hinting. For instance, in the exemplary embodiment of FIG. 1, the development tool 12 determines which of regions 101 and 104 designer 11 is working, and in response to detecting a trigger within the determined code region, the development tool 12 presents code hinting that includes data schemas for only the referenced data source(s) defined such region. For example, as illustrated in FIG. 1, code region 101 contains definition 102 that specifies that such region 101 references data source(s) A, while code region 104 contains definition 105 that specifies that such region 104 references data source(s) B. Thus, in response to detecting trigger 103 within region 101, development tool 12 presents code hinting 14 that includes data schemas 16 for only the referenced data source(s) A defined for region 101. Similarly, in response to detecting trigger 106 within region 104, development tool 12 presents code hinting 15 that includes data schemas 17 for only the referenced data source(s) B defined for region 101.

Figure 2:
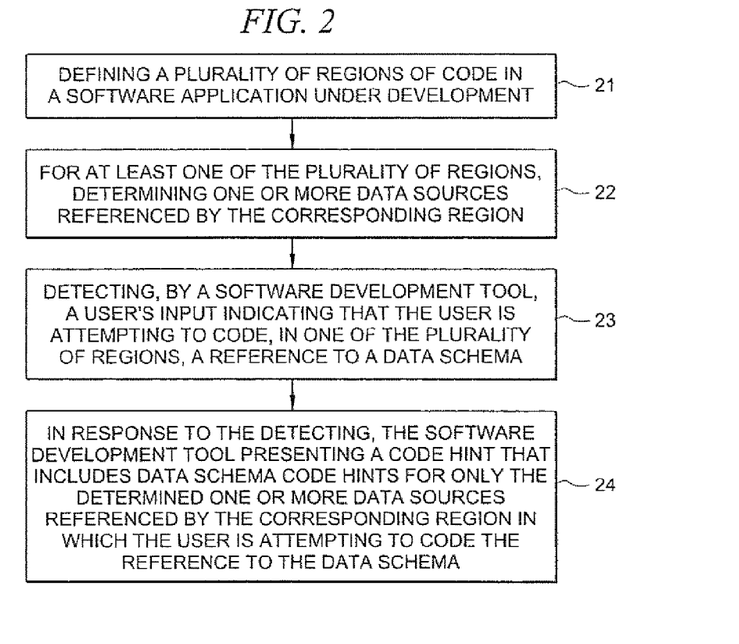
FIG. 2 shows a flow diagram illustrating an exemplary operational flow of a software development tool according to one embodiment of the present invention.

FIG. 2 shows a flow diagram illustrating an exemplary operational flow of software development tool 12 according to one embodiment of the present invention. In operational block 21, a plurality of regions of code are defined in a software application under development. For instance, as shown in FIG. 1, regions 101 and 104 are defined for a software application 13 that is under development. As discussed further herein, such regions may be defined using tags within the code, such as the <div> tag. For at least one of the plurality of regions, one or more data sources referenced by the corresponding region are determined in block 22. For instance, as mentioned above, one or more data sources may be defined as being referenced by a corresponding region. For instance, definition 102 of region 101 defines that region 101 references data source(s) A in the example of FIG. 1. Such definition of referenced data sources may be included as an attribute of the tag defining the region.

In operational block 23, the software development tool 12 detects a user's (e.g., designer 11's) input indicating that the user is attempting to code, in one of the plurality of regions, a reference to a data schema. For instance, in the example of FIG. 1, software development tool 12 detects the trigger 103 in region 101. In response to detecting such user input in block 23, the software development tool 12 (in operational block 24) presents a code hint that includes data schema code hints for only the determined one or more data sources referenced by the corresponding region in which the user is attempting to code the reference to the data schema. For instance, in the example of FIG. 1, in response to detecting trigger 103 in region 101, software development tool 12 presents code hinting 14 that includes data schema code hints for only data source(s) A that are defined (in definition 102) as being referenced by region 101.

Figure 3:
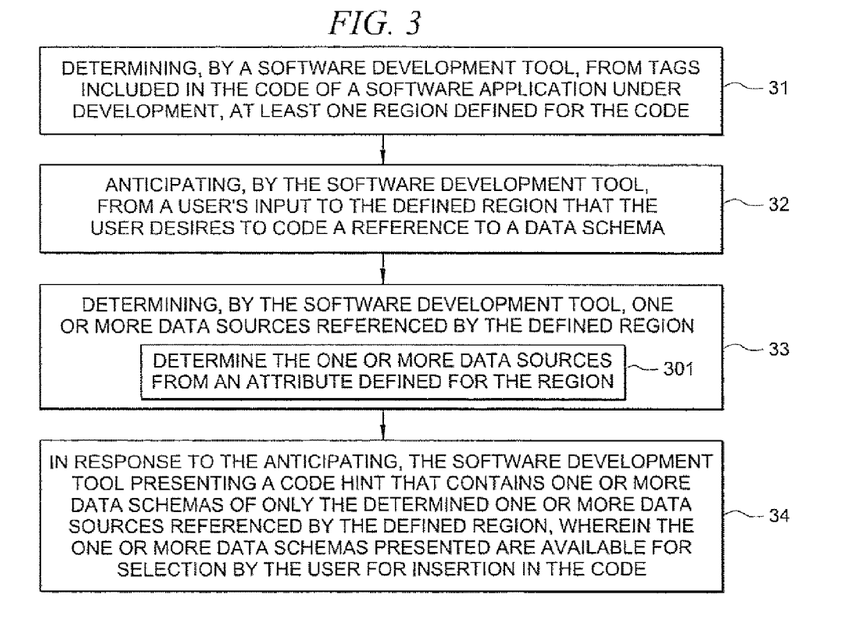
FIG. 3 shows another flow diagram illustrating an exemplary operational flow of a software development tool according to an embodiment of the present invention.

FIG. 3 shows another flow diagram illustrating an exemplary operational flow of software development tool 12 according to an embodiment of the present invention. In operational block 31, the software development tool 12 determines, from tags included in the code of a software application 13 that is under development, at least one region defined for the code. As shown in FIG. 1, a plurality of such code regions, such as regions 101 and 104, may be defined for the code of the software application 13 that is under development. In operational block 32, the software development tool 12 anticipates, from user's (e.g., designer 11's) input to the defined region that the user desires to code a reference to a data schema. For instance, in the example of FIG. 1, software development tool 12 detects the trigger 103 in region 101, which may be a "{" character or other character from which software development tool 12 is capable of determining that the designer 11 is desirous of input code referencing a data schema.

In block 33, the software development tool 12 determines one or more data sources referenced by the defined region. In certain embodiments, the software development tool 12 may so determine the data sources referenced by a defined region based on attributes specified for the defined region, such as in operational block 301. For instance, in FIG. 1, a definition 102 may be included as an attribute of a tag defining code region 101, wherein such attribute specifies one or more data sources that are referenced by the region 101 (e.g., data source(s) A in the example of FIG. 1).

In response to anticipating in block 32 that the user desires to code a reference to a data schema in the defined code region, the software development tool 12 presents, in block 34, a code hint that contains one or more data schemas of only the determined one or more data sources referenced by the defined code region, wherein the one or more data schemas presented are available for selection by the user for insertion in the code. For instance, in the example of FIG. 1, in response to detecting trigger 103 in region 101, software development tool 12 presents code hinting 14 that includes data schema code hints for only data source(s) A that are defined (in definition 102) as being referenced by region 101, wherein the user can select any of the presented data schema code hints for insertion into the code region (e.g., at the location of the code immediately following the detected trigger 103).

Certain embodiments of the present invention are implemented employing the well-known Spry framework for AJAX. The Spry framework for AJAX is a JavaScript library for web designers that provides functionality that allows designers to build pages that provide a richer experience for their users. It is designed to bring AJAX to the web design community who can benefit from AJAX, but are not well served by other frameworks. The Spry framework is a way to use the data capabilities that enable designers to incorporate XML data into their HTML documents using HTML, CSS, and a minimal amount of JavaScript, without the need for refreshing the entire page. The Spry framework is HTML-centric, and easy to implement for users with basic knowledge of HTML, CSS and JavaScript. The framework was designed such that the markup is simple and the JavaScript is minimal. The Spry framework can be used by anyone who is authoring for the web in their tool of choice.

Figure 4:
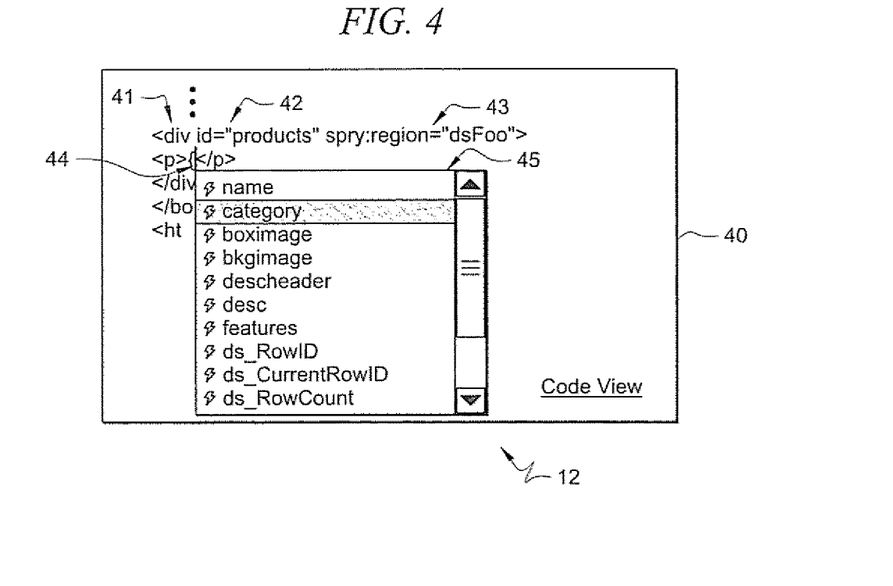
FIG. 4 shows one example of a specific application of one embodiment of the present invention.

FIG. 4 shows one example of a specific application of one embodiment of the present invention. In this example, development tool 12 is shown, which provides a code view 40 of a software application 13 that is under development. In this example, code view 40 shows the markup language code that is being authored by designer 11 for developing software application 13. A portion of the exemplary code is shown in code view 40, which in this example includes <div> tag 41 that defines a region of the code. A first attribute of the <div> tag is shown as an "id", which is set to "products," thus defining an identification of the region being defined as "products". This is a common attribute that is used with the well-known <div> tag in HTML, XML, etc., and it allows other regions of the code to refer to this region of the code (e.g., via a hyperlink, etc.) by referencing the region's "products" id. Another attribute included for the <div> tag in this example is an attribute 43 that defines one or more data sources for the "products" region. In this example, attribute 43 provides spry:region="dsFoo", thus defining that the "products" region references the "dsFoo" data source. Thus, such "products" region is an example of region 101 shown in FIG. 1, wherein attribute 43 provides definition 102 referencing data source "dsFoo" (i.e., an example of data source(s) A in FIG. 1). Accordingly, this exemplary application employs the above-mentioned Spry framework for defining the regions of the code.

Continuing with the example of FIG. 4, when designer 11 inputs trigger 44, which in this example is the "{" character, software development tool 12 detects that the designer 11 is attempting to input code referencing a data schema, and thus software development tool 12 presents code hinting pop-up window 45. Software development tool 12 determines, from the attribute 43, that the defined "products" region references the "dsFoo" data source, and thus software development tool 12 presents data schema code hints for only the referenced dsFoo data source in the code hinting pop-up window 45. This advantageously alleviates the designer 11 from having to search through data schemas of other data sources that are not referenced in the "products" region in order to find a desired data schema code in the code hinting pop-up window 45. Once the designer 11 finds a data schema code for dsFoo in code hinting pop-up window 45 that the designer 11 desires to insert at the location of trigger 44 (e.g., immediately following trigger 44), the designer can select such desired data schema code in the code hinting pop-up window 45 (e.g., by clicking on the desired data schema code with a pointing device, such as a mouse) and software development tool 12 inserts the selected data schema code into the code at the location of trigger 44.

Figure 5:
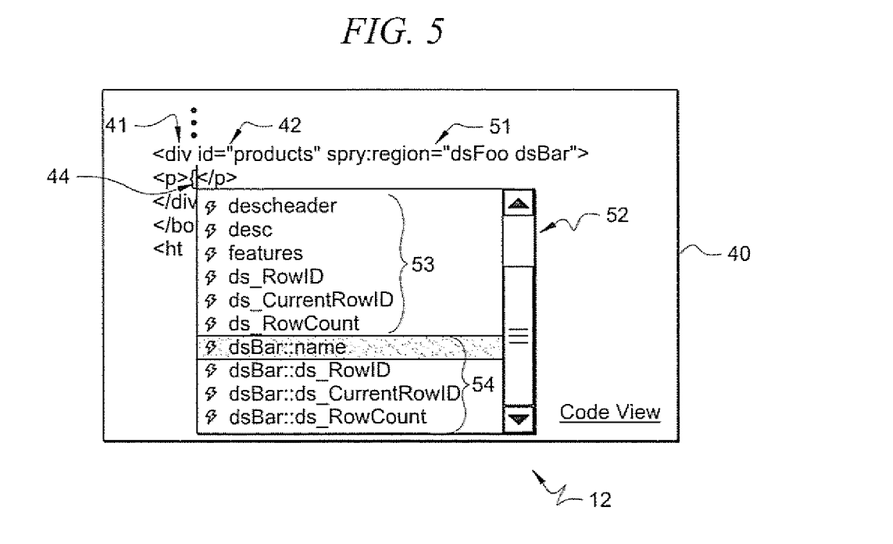
FIG. 5 shows another example of a specific application of one embodiment of the present invention.

FIG. 5 shows another example of a specific application of one embodiment of the present invention. In this example, development tool 12 is again shown, which provides a code view 40 of a software application 13 that is under development. In this example, code view 40 shows the markup language code that is being authored by designer 11 for developing software application 13. A portion of the exemplary code is shown in code view 40, which in this example includes <div> tag 41 that defines a region of the code, as in the example of FIG. 4 discussed above. A first attribute of the <div> tag is shown as an "id" which is set to "products," thus defining an identification of the region being defined as "products", again as in the example of FIG. 4 discussed above. Another attribute included for the <div> tag in this example is an attribute 51 that defines a plurality of data sources for the "products" region. In this example, attribute 51 provides spry:region="dsFoo dsBar", thus defining that the "products" region references the "dsFoo" and "dsBar" data sources. Accordingly, not only is the dsFoo data source defined as referenced by the "products" region, as in the example of FIG. 4, but also the "dsBar" data source is so defined as referenced by the "products" region of the code.

Continuing with the example of FIG. 5, when designer 11 inputs trigger 44, which in this example is the "{" character, software development tool 12 detects that the designer 11 is attempting to input code referencing a data schema, and thus software development tool 12 presents code hinting pop-up window 52. Software development tool 12 determines, from the attribute 43, that the defined "products" region references the "dsFoo" and "dsBar" data sources, and thus software development tool 12 presents data schema code hints for only these two referenced data sources in the code hinting pop-up window 52. That is, data schema code hints 53 for data source "dsFoo" are presented in code hinting pop-up window 52, and data schema code hints 54 for data source "dsBar" are also presented in code hinting pop-up window 52 in this example. This advantageously alleviates the designer 11 from having to search through data schemas of other data sources that are not referenced in the "products" region in order to find a desired data schema code in the code hinting, pop-up window 52. Once the designer 11 finds a data schema code for dsFoo or dsBar in code hinting pop-up window 52 that the designer 11 desires to insert at the location of trigger 44 (e.g., immediately following trigger 44), the designer can select such desired data schema code in the code hinting pop-up window 52 (e.g., by clicking on the desired data schema code with a pointing device, such as a mouse) and software development tool 12 inserts the selected data schema code into the code at the location of trigger 44.

So, FIG. 5 provides an example of a region "products" being bound to two data sources (dsFoo and dsBar). In certain embodiments, order of priority may be defined for the data sources that are referenced by a given region. For instance, the order in which the data sources are defined in the attribute 51 may specify an order of priority of the data sources. In the illustrated example of FIG. 5, the primary data source is "dsFoo" due to "order of occurance" in the attribute 51 (i.e., because dsFoo is listed first, before the dsBar data source). As such, dsFoo data schema codes 53 are presented in code hinting pop-up window 52 without a prefix, such that those data schema members 53 of dsFoo can be referenced without a prefix identifying dsFoo; whereas data schema codes 54 for the secondary dsBar data source are presented in code hinting pop-up window 52 with a "dsBar" prefix (i.e., "dsBar::" prefix), such that those data schema members 54 of dsBar are referenced with the "dsBar" prefix.

In certain embodiments, software development tool 12 may reference a document object model (DOM) for the application 13 that is under development to determine the appropriate data schemas to include in a presented code hinting. As is well-known in the art a DOM generally refers to a platform- and language-independent standard object model for representing markup language (HTML, XML, etc.) format of a document, such as application 13. According to certain embodiments, based on the user's (e.g., designer 11's) current position in the code of application 13 (e.g., markup language page document), the software development tool 12 searches the DOM to determine the corresponding region in which the user is working. For instance, from the user's current position in the application 13, the software development tool 12 searches up the application 13's DOM tree of nodes (e.g., HTML nodes) for the parent region (<div>) with spry:region, spry:detailregion attribute (e.g., <div id="productDesc" spry:region="dsProductDetails">...html code <IP>...html code </div>). When the user is near the <IP> and types the "{" character, the software development tool provides the list of column names tied to dsProductDe-tails only, though other data sets can live on that page but are not setting used in the containing UI block. Thus, the software development tool 12 provides a more targeted and narrow list of column names available on the page for data binding based on containing block attributes and position of <IP>.

Figure 6:
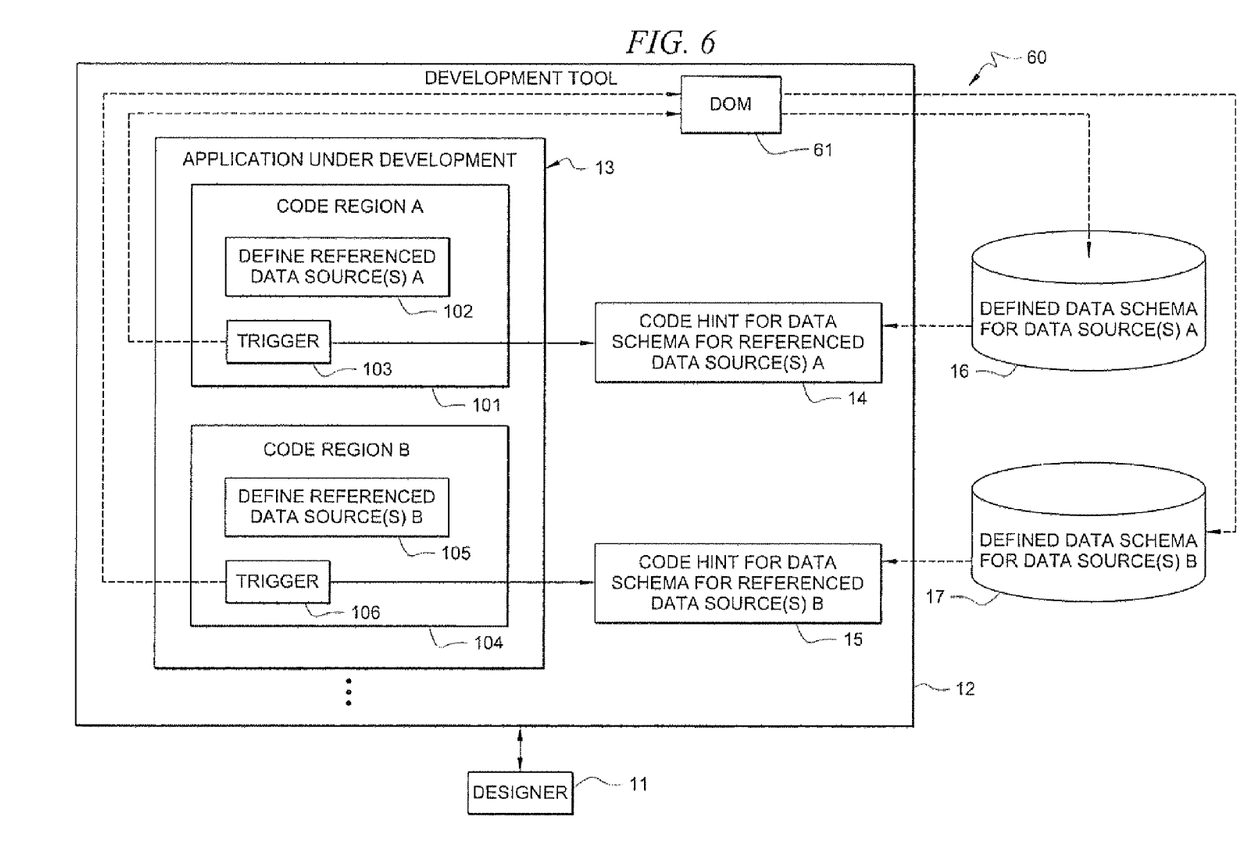
FIG. 6 shows an exemplary system in which a software development tool accesses a DOM according to one embodiment of the present invention.

FIG. 6 shows an exemplary system 60 in which software development tool 12 accesses a DOM 61 according to one embodiment of the present invention. As in the example of FIG. 1, designer 11 interacts with development tool 12 to develop application 13 that comprises code regions 101 and 104. Software development tool 12 is operable to monitor the designer 11's input to the code of application 13 and recognize input that indicates that the designer 11 is attempting to input code referencing a data schema, and in response to such recognition the development tool 12 presents code hinting to aid the designer 11 as to the code for referencing a data schema. For example, in response to recognizing designer 11 inputting a trigger 103 within region 101, wherein trigger 103 may be any input to the code that indicates the designer 13 is desiring to input code referencing a data schema, the development tool 12 presents code hinting 14, as discussed above with FIG. 1. Similarly, in response to recognizing designer 11 inputting a trigger 106 within region 104, wherein trigger 106 may be any input to the code that indicates the designer 13 is desiring to input code referencing a data schema, the development tool 12 presents code hinting 15, as discussed above with FIG. 1.

As FIG. 6 illustrates, in certain embodiments, software development tool 12 may access DOM 61 of application 13 to determine which of defined regions 101 and 104 designer 11 is working at a given time. For instance, in response to detecting trigger 103 being input by designer 11 within region 101, development tool 12 may access DOM 61 to determine that trigger 103 is located within defined region 101. Thus, software development tool 12 can determine (e.g., from definition 102, which may be an attribute of the region 101) that data source(s) A are referenced by the region 101 within which trigger 103 is located, and in response, present only data schemas 16 for such referenced data source(s) A in code hinting 14.

Similarly, in response to detecting trigger 106 being input by designer 11 within region 104, development tool 12 may access DOM 61 to determine that trigger 106 is located within defined region 104. Thus, software development tool 12 can determine (e.g., from definition 105, which may be an attribute of the region 104) that data source(s) B are referenced by the region 104 within which trigger 106 is located, and in response, present only data schemas 17 for such referenced data source(s) B in code hinting 15.

Using AJAX, a designer can bind data on the client-browser and "update certain regions of a web page" without incurring "a full page refresh." The regions may be defined using the <div> tag in the markup code for the web page, as is well known. According to embodiments of the present invention, the region defining element (e.g., the <div> tag) can include an attribute specifying referenced data source(s) for the region, and based on such attached data source(s), the software development tool 12 can narrow down the data schema code hinting list presented for the region to give more targeted code hinting to the designer 11. Traditionally, the designer 11 would typically have to remember the column/schema names for the data set and type them by hand manually within the code for an application 13. The user would also have to ensure manually that he is typing the correct data reference based on which page regions are tied to which data sets. As discussed above, according to embodiments of the present invention, the software development tool 12 can provide the designer 13 with a more targeted data schema code hinting based on which page regions are bound to which data sources.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
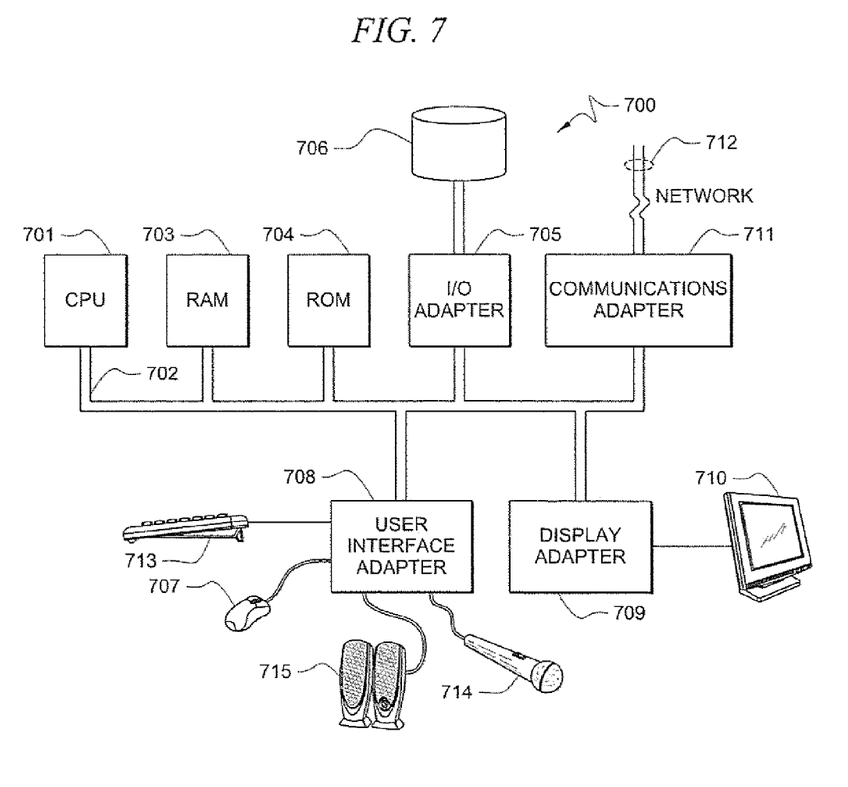
FIG. 7 shows an exemplary system on which a software development tool may be implemented according to one embodiment of the present invention.

FIG. 7 illustrates an exemplary computer system 700 on which the software development tool 12 may be implemented according to one embodiment of the present invention. Central processing unit (CPU) 701 is coupled to system bus 702. CPU 701 may be any general-purpose CPU. The present invention is not restricted by the architecture of CPU 701 (or other components of exemplary system 700) as long as CPU 701 (and other components of system 700) supports the inventive operations as described herein. CPU 701 may execute the various logical instructions according to embodiments of the present invention. For example, CPU 701 may execute machine-level instructions according to the exemplary operational flows described above in conjunction with FIGS. 2-3.

Computer system 700 also preferably includes random access memory (RAM) 703, which may be SRAM, DAM, SDRAM, or the like. Computer system 700 preferably includes read-only memory (ROM) 704 which may be PROM, EPROM, BEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as authoring code for an application 13 that is under development, as described above.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for operations of the development tool 12. Communications adapter 711 is preferably adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display information pertaining to an application under development, such as code view 40 of FIGS. 4 and 5, code hinting pop-up windows 45 and 52 of FIGS. 4 and 5, respectively, and, in some embodiments, a graphical-based design-time view, as examples.

It shall be appreciated that the present invention is not limited to the architecture of system 700. For example, any suitable processor-based device may be utilized for implementing development tool 12, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
defining, by a software development tool executed by a processor, one or more regions of code in a software application under development using tags, wherein each tag includes a definition that indicates one or more data sources referenced by the region;
for at least one region, determining, by the software development tool, the one or more data sources referenced by the tag of the at least one region;
detecting, by the software development tool, input indicating an attempt to code a reference to a data schema in the at least one region, wherein the data schema comprises one or more data types defined for a data source;
determining, by the software development tool, one or more data schemas corresponding to the one or more data sources referenced by the at least one region; and
based on determining the one or more data schemas corresponding to the one or more data sources, presenting, by the software development tool, data schema code hints for only the one or more data schemas corresponding to the one or more data sources, wherein the code hints indicate data types corresponding to the one or more data sources,
receiving, by the software development tool, input selecting one of the presented data schema code hints; and
inserting, by the software development tool, the selected data scheme code hint into the code, wherein the selection references the data type indicated by the code hint, and is inserted at a location in the code at which the input indicating an attempt to code a reference to a data schema was detected.

2. The method of claim 1 wherein the code comprises markup language code, and wherein said defining comprises:
including block-level element tags in the code for defining the one or more regions.

3. The method of claim 1 wherein the presented data schema code hints presented are available for selection for insertion in the code.

4. A method comprising:
determining, by a software development tool executed by a processor, at least one region defined for code of a software application under development using tags, wherein each tag includes a definition that indicates one or more data sources referenced by the region;
anticipating, by the software development tool, from input to the at least one defined region a desire to code a reference to a data schema, wherein the data schema comprises one or more data types defined for the data source;
determining, by the software development tool, the one or more data sources referenced by the tag of the at least one region;
determining, by the software development tool, one or more data schemas corresponding to the one or more data sources referenced by the at least one defined region; and
in response to anticipating, presenting, by the software development tool, data schema code hints for only the one or more data schemas corresponding to the one or more data sources, wherein the code hints indicate data types corresponding to the one or more data sources,
receiving, by the software development tool, input selecting one of the presented data schema code hints; and
inserting, by the software development tool, the selected data scheme code hint into the code, wherein the selection references the data type indicated by the code hint, and is inserted at a location in the code at which the input indicating an attempt to code a reference to a data scheme was detected.

5. The method of claim 4 wherein the at least one region comprises a plurality of regions defined for the code of the software application under development.

6. The method of claim 4 wherein the one or more data schemas presented are available for selection for insertion in the code.

7. A method comprising:
determining, by a software development tool executed by a processor, a plurality of regions defined for code of a software application under development,
detecting, by the software development tool, a trigger input to one of the plurality of regions, wherein said trigger indicates a desire to code a reference to a data schema, wherein the data schema comprises one or more data types defined for a data source;
determining, by the software development tool, one or more data sources referenced by the one of the plurality of regions; and
in response to the detecting, presenting, by the software development tool, data schema code hints for only the determined one or more data sources referenced by the one of the plurality of regions in which the trigger was detected.

8. The method of claim 7 wherein said determining of the one or more regions comprises defining the one or more regions based on tags included in the code.

9. The method of claim 8 wherein, for at least the tags defining the one of the plurality of regions, an attribute is included that specifies the one or more data sources referenced by the one of the plurality of regions.

10. The method of claim 9 wherein said determining one or more data sources referenced by the one of the plurality of regions comprises:
determining the one or more data sources from said attribute of said tags that defines said one of the plurality of regions.

11. The method of claim 7 wherein the presented data schema code hints presented are available for selection for insertion in the code.

12. The method of claim 7 further comprising:
receiving, by the software development tool, input selecting one of the presented data schema code hints; and
inserting, by the software development tool, the selected data schema code hint into the code.

13. A non-transitory computer-readable medium embodying program code which, when executed by a computer, causes the computer to perform a method comprising:
detecting a trigger input to one of a plurality of regions defined for markup language code, wherein said trigger indicates a desire to code a reference to a data schema, wherein the data schema comprises one or more data types defined for a data source;
determining one or more data sources referenced by the one of the plurality of regions in which the trigger resides;
determining, by the software development tool, one or more data schemas corresponding to the one or more data sources referenced by the one of the plurality of regions in which the trigger is located; and
based on determining the one or more data schemas corresponding to the one or more data sources, presenting data schema code hints for only the one or more data schemas corresponding to the one or more data sources.

14. The computer-readable medium of claim 13 further comprising code, that when executed by the computer, causes the computer to:
determine the plurality of regions based on tags included in the code that define the plurality of regions.

15. The computer-readable medium of claim 14 wherein, for at least the tags that define the one of the plurality of regions, an attribute is included that specifies the one or more data sources referenced by the one of the plurality of regions, said computer-readable medium further comprising code that, when executed by the computer, causes the computer to:
perform the determining the one or more data sources from said attribute of said tags that defines said one of the plurality of regions.

16. The computer-readable medium of claim 13 further comprising code that, when executed by the computer, causes the computer to perform the method comprising:
receiving input selecting one of the presented data schema code hints; and
inserting the selected data schema code hint into the code.

17. A system comprising:
a processor configured to execute instructions stored in non-transitory computer-readable medium;
software development tool comprised in the computer-readable medium and operable to receive input for developing a software application, wherein the software development tool is operable to:
detect a trigger input to one of a plurality of regions defined for code of the software application under development, wherein said trigger indicates a desire to code a reference to a data schema, wherein the data schema comprises one or more data types defined for a data source,
determining one or more data schemas corresponding to one or more data sources referenced by the one of the plurality of regions to which the trigger is input, and
in response to detecting the trigger, output a code hint, wherein said code hint contains data schema code hints for only the one or more data schemas corresponding to the one or more data sources.

18. The system of claim 17 wherein said software development tool is further operable to determine the plurality of regions based on tags included in the code that define the plurality of regions.

19. The system of claim 18 wherein, for at least the tags that define the one of the plurality of regions in which the trigger is input, an attribute is included that specifies the one or more data sources referenced by the one of the plurality of regions, said software development tool further operable to determine the one or more data sources referenced by the one of the plurality of regions from said attribute of said tags that defines said one of the plurality of regions.

20. The system of claim 17 wherein said software development tool is further operable to receive input selecting one of the presented data schema code hints, and
insert the selected data schema code hint into the code.

21. A method comprising:
determining, by a software development tool executed by a processor, a plurality of regions defined for code of a software application under development;
detecting, by the software development tool, a trigger input to one of the plurality of regions, wherein said trigger indicates a desire to code a reference to a data schema, wherein the data schema comprises one or more data types defined for a data source;
in response to the detecting, determining, by the software development tool, one or more data sources referenced by the one of the plurality of regions by referencing a document object model for the software application;
determining, by the software development tool, one or more data schemas corresponding to the one or more data sources by referencing the document object model; and
presenting, by the software development tool, data schema code hints for the one or more data schemas corresponding to the one or more data sources.

22. The method of claim 21 further comprising:
said determining said plurality of regions based on tags included in the code that define the plurality of regions; and
said determining one or more data sources referenced by the one of the plurality of regions based on an attribute of the tags that define the one of the plurality of regions, wherein said attribute specifies the one or more data sources referenced by the one of the plurality of regions.

* * * * *